US008536751B2

(12) United States Patent
Cipriani

(10) Patent No.: US 8,536,751 B2
(45) Date of Patent: Sep. 17, 2013

(54) ELECTROMAGNETIC DEVICE WITH REVERSIBLE GENERATOR-MOTOR OPERATION

(75) Inventor: Marco Cipriani, Turin (IT)

(73) Assignee: AVIO S.p.A., Turin (IT)

( * ) Notice: Subject to any disclaimer, the term of this patent is extended or adjusted under 35 U.S.C. 154(b) by 258 days.

(21) Appl. No.: 12/735,498

(22) PCT Filed: Jan. 21, 2009

(86) PCT No.: PCT/IB2009/050214
§ 371 (c)(1),
(2), (4) Date: Oct. 8, 2010

(87) PCT Pub. No.: WO2009/093181
PCT Pub. Date: Jul. 30, 2009

(65) Prior Publication Data
US 2011/0025066 A1 Feb. 3, 2011

(30) Foreign Application Priority Data
Jan. 21, 2008 (EP) ..................................... 08425027

(51) Int. Cl.
H02K 1/06 (2006.01)
H02K 17/00 (2006.01)
H02K 19/00 (2006.01)
H02K 21/00 (2006.01)
H02K 27/02 (2006.01)
H02K 23/44 (2006.01)

(52) U.S. Cl.
CPC ....................................... H02K 23/44 (2013.01)
USPC .......... 310/191; 310/68 B; 310/68 C; 310/91; 310/99; 310/216.023; 310/209; 310/268

(58) Field of Classification Search
CPC ..................................................... H02K 23/44
USPC ............................ 310/91, 209, 216.023, 268
IPC ............ H02K 1/06, 17/00, 19/00, 21/00, 23/44, H02K 27/02
See application file for complete search history.

(56) References Cited

U.S. PATENT DOCUMENTS
2,724,067 A * 11/1955 Herrick .......................... 310/268
3,760,392 A *  9/1973 Stich ......................... 340/870.37
(Continued)

FOREIGN PATENT DOCUMENTS
BE          867436       9/1978
CN         1561569       1/2005
(Continued)

OTHER PUBLICATIONS
Notification of the First Office Action mailed Sep. 11, 2012 in CN 200980110632.0 [with English translation].
(Continued)

Primary Examiner — John K Kim
(74) Attorney, Agent, or Firm — Davidson Berquist Jackson & Gowdey, LLP

(57) ABSTRACT

An electromagnetic device has a stator and a rotor rotating between facing surfaces of the stator and bearing a plurality of magnets distributed at regular intervals along its periphery. The magnets are so arranged that they form a sequence of alternately opposite poles on the surfaces of the rotor directed towards the stator, and the stator comprises two sets of independently supported magnetic yokes located at both sides of the rotor in front of the magnets. The magnetic yokes have two axially oriented arms, the end surfaces of which, in static conditions of the rotor, at least partly face a pair of successive magnets on a same surface of the rotor.

37 Claims, 10 Drawing Sheets

(56) References Cited

U.S. PATENT DOCUMENTS

| | | | |
|---|---|---|---|
| 3,784,850 A * | 1/1974 | Inaba et al. | 310/49.23 |
| 4,879,484 A * | 11/1989 | Huss | 310/114 |
| 5,191,255 A * | 3/1993 | Kloosterhouse et al. | 310/156.38 |
| 5,696,419 A * | 12/1997 | Rakestraw et al. | 310/268 |
| 5,698,419 A * | 12/1997 | Wolpe et al. | 435/70.21 |
| 5,834,872 A | 11/1998 | Lamb | |
| 5,918,360 A * | 7/1999 | Forbes et al. | 29/596 |
| 5,982,070 A * | 11/1999 | Caamano | 310/216.047 |
| 6,137,203 A | 10/2000 | Jermakian et al. | |
| 6,617,746 B1 | 9/2003 | Maslov et al. | |
| 6,844,647 B2 * | 1/2005 | Horber | 310/156.43 |
| 7,081,696 B2 * | 7/2006 | Ritchey | 310/114 |
| 7,105,972 B2 * | 9/2006 | Gallant | 318/400.31 |
| 8,106,563 B2 * | 1/2012 | Ritchey | 310/268 |
| 2002/0047346 A1 * | 4/2002 | Miekka et al. | 310/68 B |
| 2003/0189388 A1 * | 10/2003 | Hashimoto et al. | 310/268 |
| 2004/0123603 A1 | 7/2004 | Care et al. | |
| 2007/0018524 A1 | 1/2007 | Yonemori et al. | |
| 2008/0074068 A1 * | 3/2008 | Takeuchi | 318/472 |
| 2011/0025066 A1 * | 2/2011 | Cipriani | 290/52 |
| 2011/0025067 A1 * | 2/2011 | Cipriani | 290/52 |

FOREIGN PATENT DOCUMENTS

| | | |
|---|---|---|
| CN | 1992469 | 7/2007 |
| EP | 1804373 | 4/2007 |
| JP | 2005-057941 | 3/2005 |
| JP | 2008-048519 | 2/2008 |
| WO | WO 2004/004109 | 1/2004 |
| WO | WO 2004/073143 | 8/2004 |
| WO | WO 2007/069859 | 6/2007 |
| WO | WO 2009/093183 | 7/2009 |

OTHER PUBLICATIONS

International Search Report mailed Mar. 4, 2010 in PCT Appln. No. PCT/IB2009/050214.

International Search Report mailed Nov. 9, 2009 in PCT Appln. No. PCT/IB2009/050219.

* cited by examiner

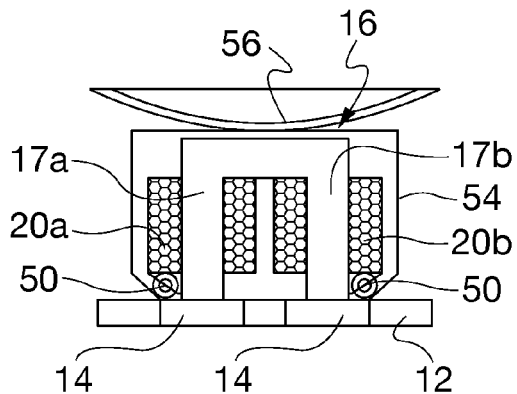
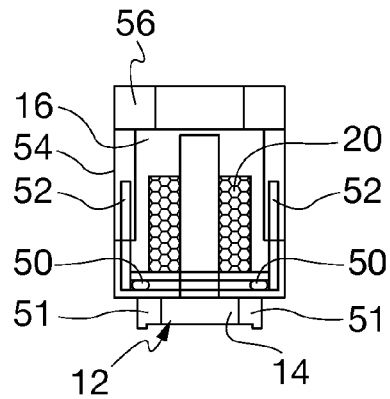
Fig. 20     Fig. 21
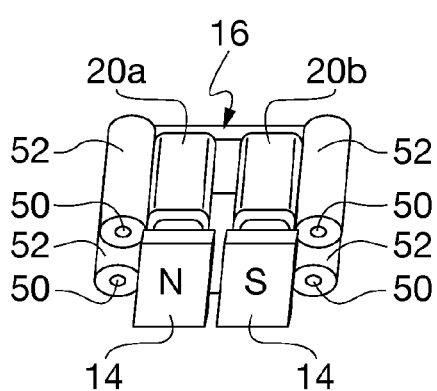
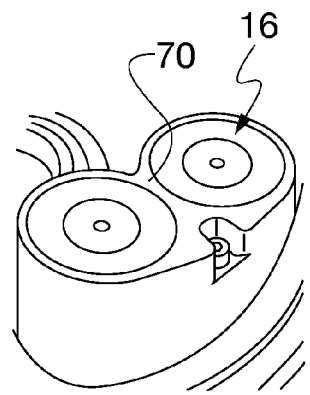
Fig. 22     Fig. 23
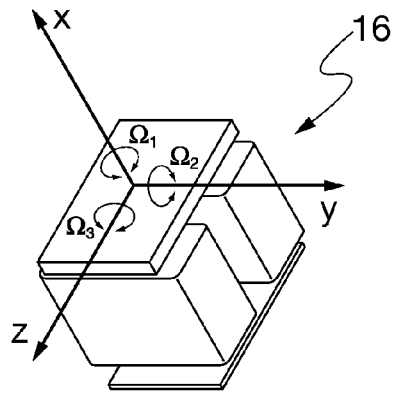
Fig. 24

ELECTROMAGNETIC DEVICE WITH REVERSIBLE GENERATOR-MOTOR OPERATION

The present invention relates to an electromagnetic device with reversible generator-motor operation, that is, a device capable of converting kinetic energy into electric energy and vice versa.

In many industrial fields the need often arises to install reversible electrical machines into systems comprising a rotary member, so that, depending on the operating condition of the system in which a machine is installed, it is possible either exploiting the motion of such member to generate electric energy for supplying other system components, or supplying the machine with electric energy to make the rotary member rotate.

A general requirement for such machines is compactness and lightness, especially for applications in transport means, such as terrestrial vehicles or aircrafts, as well as cheapness.

An example of a machine of this kind is known from U.S. Pat. No. 6,832,486. This document discloses a reversible electrical machine for aeronautical applications, to be coupled with a turbine of an aircraft engine in order to generate electric energy for various purposes by exploiting the turbine rotation or, conversely, to start the engine. The rotor of the machine is formed by a magnetised, radially outward extremity of the blades of a blade ring in the turbine. A stator ring, internally of which the rotor moves, is equipped with coils. In one embodiment, the stator consists of a continuous ring, or of a set of discrete horseshoe-shaped members, and defines a channel within which the rotor rotates. In this case, the coils are wound on opposite stator expansions and they face both poles of a same magnet.

A drawback of this prior art is that the width of the channel defined between the facing expansions of the stator ring or of the individual horseshoe-shaped cores is fixed and cannot become smaller than a certain minimum value, which depends also on the rotor thickness and on the need to compensate for possible rotor oscillations. Thus, with a given stator and a given rotor, also the air-gap between the stator and the magnets is fixed and cannot be made smaller than a certain value. Consequently, it is impossible to adjust and optimise the relative position of the stator and the rotor so as to obtain the maximum efficiency and the maximum operating flexibility.

U.S. Pat. No. 5,514,923 discloses a reversible electrical machine that can be used as a flywheel, and that has two rotor discs equipped with magnets and symmetrically arranged relative to a stator bearing a plurality of coils offset relative to the magnets. In such case, two magnets are used to induce an electric field into a coil located therebetween. The magnetic circuit is not closed and this entails a high energy waste and results in strong electromagnetic interferences.

BE 867.436 discloses an electrical device having a rotor comprising two aluminium discs joined by an iron ring and bearing each a plurality of magnets distributed at regular intervals along its periphery. The rotor rotates between two stator plates each bearing a ring of U-shaped magnetic yokes with axially directed arms (projecting pole machine), wherein each yoke faces a pair of magnets in the rotor disc, and the magnets present, towards the yokes, a sequence of alternately opposite poles. The machine is not reversible and acts only as a synchronous motor. Moreover the air gap between the stator and the rotor is fixed, so that the considerations made in this respect in connection with U.S. Pat. No. 6,832,486 apply also to this device. Further, the materials used give rise to very high losses at high frequencies and to very strong Foucault currents and hysteresis losses that induce very high temperatures in the disc and can lead to demagnetisation of the magnets and even to the firing of the aluminium disc.

U.S. Pat. No. 6,137,203 discloses a brushless axial motor with two stators and a rotor rotatably mounted between the stators in response to magnetic fields generated by the stators. The machine is a multiphase machine of the "winding" type, i.e. the coils of each phase are wound over a plurality of adjacent polar expansions, without any coil of different phase between them. The stators are axially adjustable during operation to vary the motor's air gap in order to allow the motor to produce a high torque at low speed, while the air gap is small, and to continue producing torque, when the air gap is larger, at high speed. Adjustment of the stator takes place only in axial direction and it does not allow coping with deformations arising because of the high temperatures reached during the operation of the device, especially in the preferred applications to fluid-operated turbines, nor with a possible overheating of the coils and the stator.

U.S. Pat. No. 4,710,667 discloses a dynamoelectric machine of the winding type, in which the gap between the rotor and a stator is adjustable only axially and only in the assembling phase. The rotor includes hard-ferrite magnets, and the stator includes soft-ferrite cores for the coils.

All prior art documents discussed above disclose moreover rigidly built structures, whose design cannot be easily modified in order to suit to applications with different requirements and/or to allow an easier and more effective assembling and maintenance of the devices.

It is an object of the invention to provide a reversible device of the projecting pole type, which remedies the drawbacks of the prior art and which can be employed in a wide range of applications, e.g. in terrestrial vehicles, ships and aircrafts, and preferably in applications in which the device is integrated in a turbine or generally in the impeller of an apparatus driven by the motion of a fluid.

To attain this object, there is provided a device having a stator and a rotor rotating in front of the stator. The rotor bears a plurality of magnets distributed at regular intervals and with alternate orientations in a ring pattern on the rotor. The stator comprises at least one set of magnetic yokes each having a pair of projecting arms extending towards the rotor and bearing a coil for electrical connection to a utilising device or a power driver, and a magnetic yoke in the or each set is part, together with a pair of magnets confronting the yoke arms at a given instant and the air gap separating the yoke from the magnets, of a same closed magnetic circuit. The magnetic yokes in the or each set are independently mounted on axially and radially adjustable supports for a static and dynamic adjustment of the positions of the yokes relative to the magnets.

Advantageously, adjustment can include also a pivotal movement about at least one axis and preferably the yokes are adjustable through a translational movement along three orthogonal axes and a pivotal movement about three orthogonal axes.

Thanks to the independent mounting, each yoke can be considered as a stator cell that can be replicated a desired number of times and with any desired relative position with the other cells. Thus, the invention affords an extremely high flexibility. Other advantages are that:

assembling of the device is easier;
    the relative position of yokes and magnets can be optimised when assembling the device, thereby ensuring the maximum efficiency of the device;

during operation, oscillations, vibrations and deformations of the rotor can be easily compensated for;

in case of bad operation or short-circuits in one cell, it is possible to exclude from operation only that cell, while the rest of the device continues operating;

in case of a modular machine having both generator and motor modules, it is possible to adjust independently the performance of the generator and motor modules: e.g., at the start, the distance of the yokes of the generator modules can be increased to temporarily disable or set to a limited value the generator function or yet to electronically leave the utilising circuits open in order to facilitate starting, whereas the yokes of the motor modules can be brought closer to the magnets in order to increase acceleration.

A single set of yokes can be provided, and the magnets then form the sequence of alternate poles on one surface of the rotor. The rotor may be made of ferromagnetic material, in which case the magnetic circuits comprise a pair of magnets and one yoke and are closed through the air gap and the rotor. If, in the areas not occupied by the magnets, the rotor is made of non-ferromagnetic material, the magnets facing a same yoke will be connected by ferromagnetic elements, and the magnetic circuit is closed through the air gap and said ferromagnetic element.

In the alternative, when the rotor, in the areas not occupied by the magnets, is made of non-ferromagnetic material, the stator can include two sets of magnetic yokes symmetrically arranged relative to the rotor. In such case, a pair of successive magnets forms a closed magnetic circuit with one magnetic yoke in the first set and one magnetic yoke in the second set (plus, of course, the respective air gaps). The yokes in each set are supported independently of the yokes in the other set.

The or each set of yokes can face the whole ring of magnets, or it can face only one arc or discrete arcs of such ring.

When the yokes face the whole ring of magnets, the rotor can bear a number of magnets twice the number of yokes (that is a number of magnets equal to the number of projecting arms or polar expansions), or it can bear an even number of magnets different from the number of polar expansions. In the latter case, a given geometrical phase relationship between an arm and confronting magnet periodically occurs. Those configurations are suitable for building multiphase machines. In such configurations, coils for collection or supply of electric power wound on arms having the same geometrical phase relationship with a confronting magnet can be connected together inside the device and have a common connection to the power driver or the utilising device. It is also possible to connect together every second coil among the coils wound on arms having the same geometrical phase relationship with a confronting magnet, and to connect the two resulting coil groups to the power driver or the utilising device with electrical phases shifted by 180°.

The device can find several applications, especially in association with an impeller of an apparatus driven by the motion of a fluid, in particular in Aeolian generators or in aeronautical or naval turbine engines or propellers: for instance, in aeronautical or naval applications it can be used for instance as a generator integrated into the turbine or as a starting or feedback motor for the turbine, or a motor associated with naval or aeronautical propellers. Other applications can be in pumps for gas pipelines.

According to another aspect, the invention also concerns the impeller of an apparatus driven by the motion of a fluid, e.g. an Aeolian generator, a turbine engine for aircrafts or ships, a screw of naval and aeronautical propellers, a pump for gas pipelines and the like, having integrated therein a device according to the invention.

The device according to the invention will now be described in greater detail with reference to the accompanying drawings, given by way of non limiting examples, in which:

FIGS. 16 and 16b are enlarged axial section of a yoke arm and of a yoke, respectively, as used in the multiphase machines of FIGS. 13 to 15;

Figure 18:
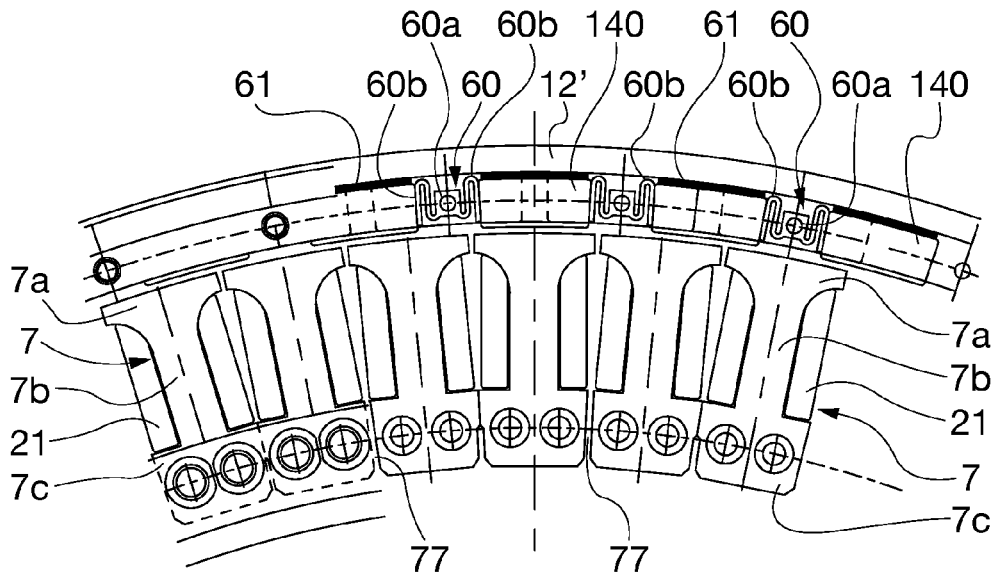
Figure 19:
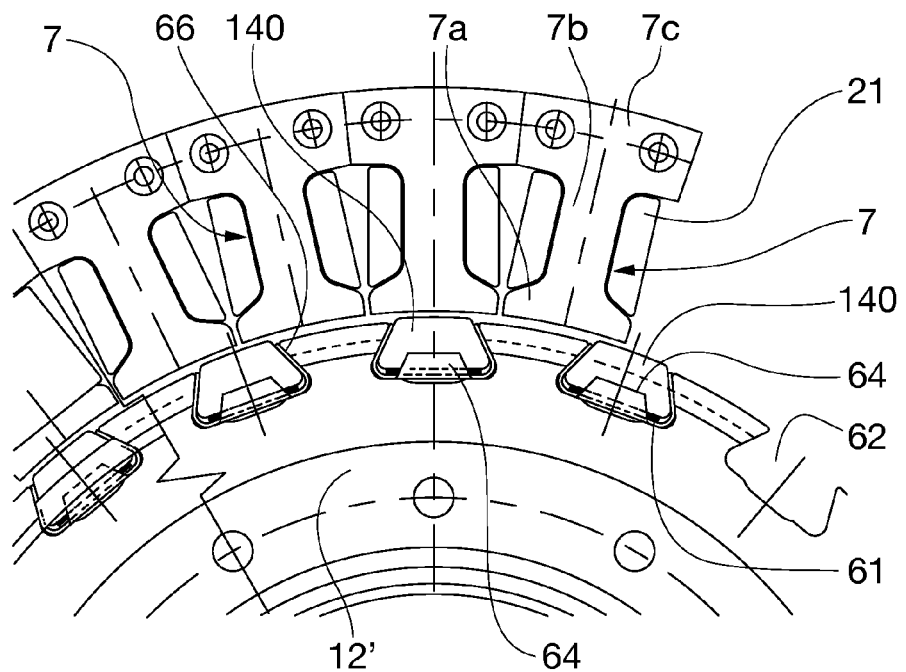
Figure 25:
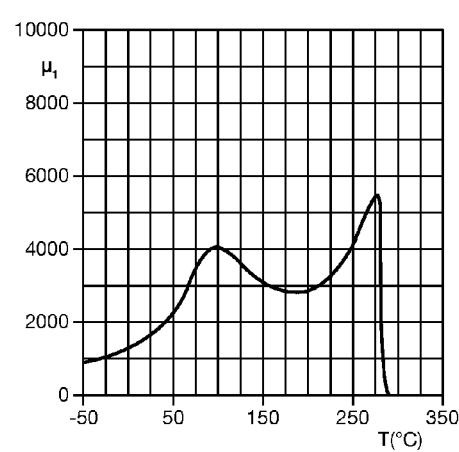
Figure 26:
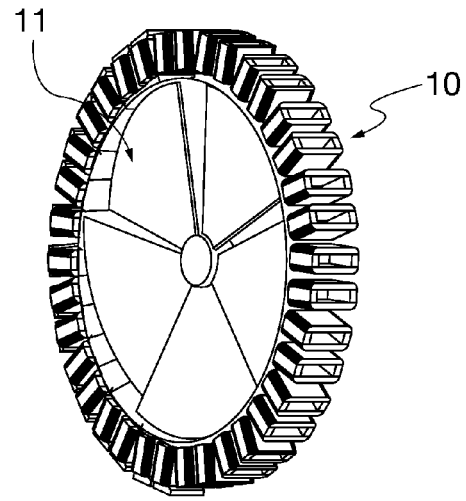
Figure 27:
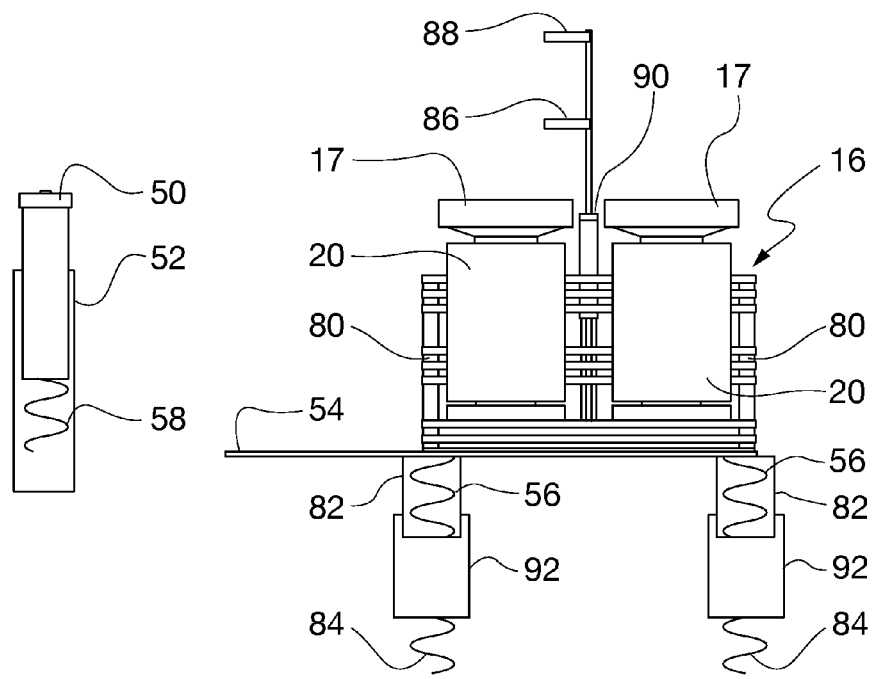

FIGS. 17(a) to 17(d) are different views of a magnet with a double tapering;

FIGS. 18 and 19 are plan views of part of a radial machine with external and internal rotor, respectively, showing possible mountings of the magnets;

FIGS. 20 to 22 are different views of a yoke associated with means for adjusting its position;

FIG. 23 shows a yoke embodied in a resin layer;

FIG. 24 shows a yoke together with the indications of the translational and pivotal adjustments;

FIG. 25 is a chart of the magnetic permeability of a ferrite;

FIG. 26 shows the application of the invention to a ship or aircraft propeller;

FIG. 27 is a principle diagram of a stator cell; and

Figure 28:
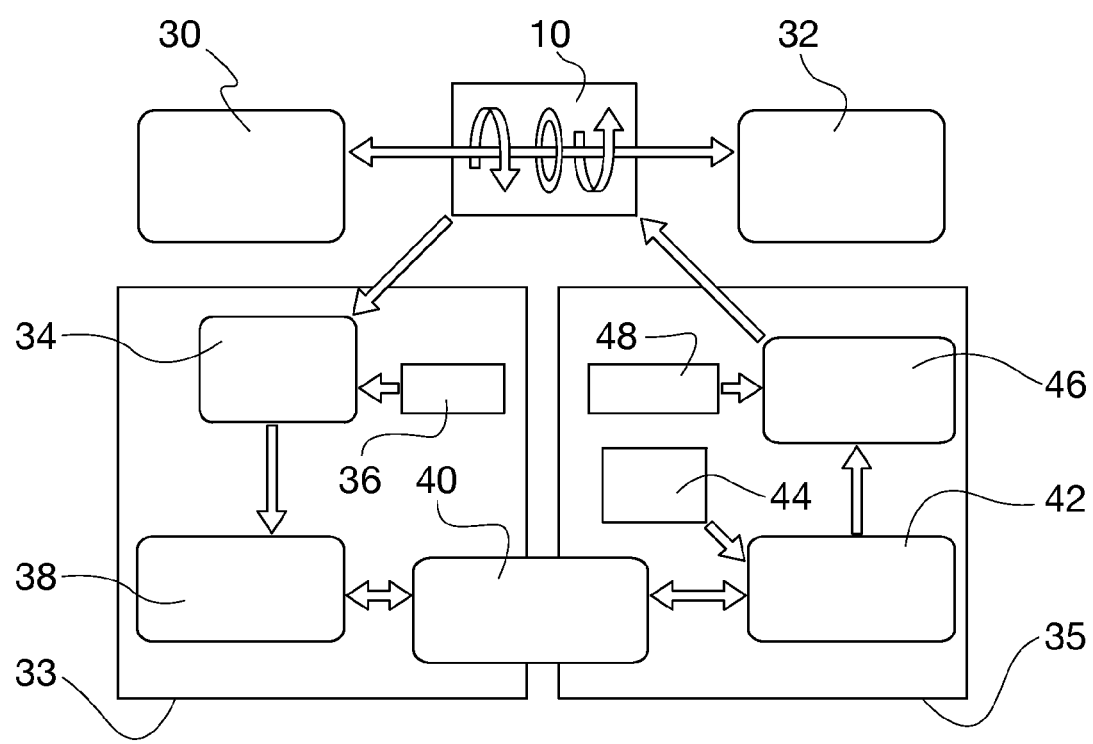

FIG. 28 is a principle diagram showing the use of the device as an electromagnetic flywheel.

Figure 1:
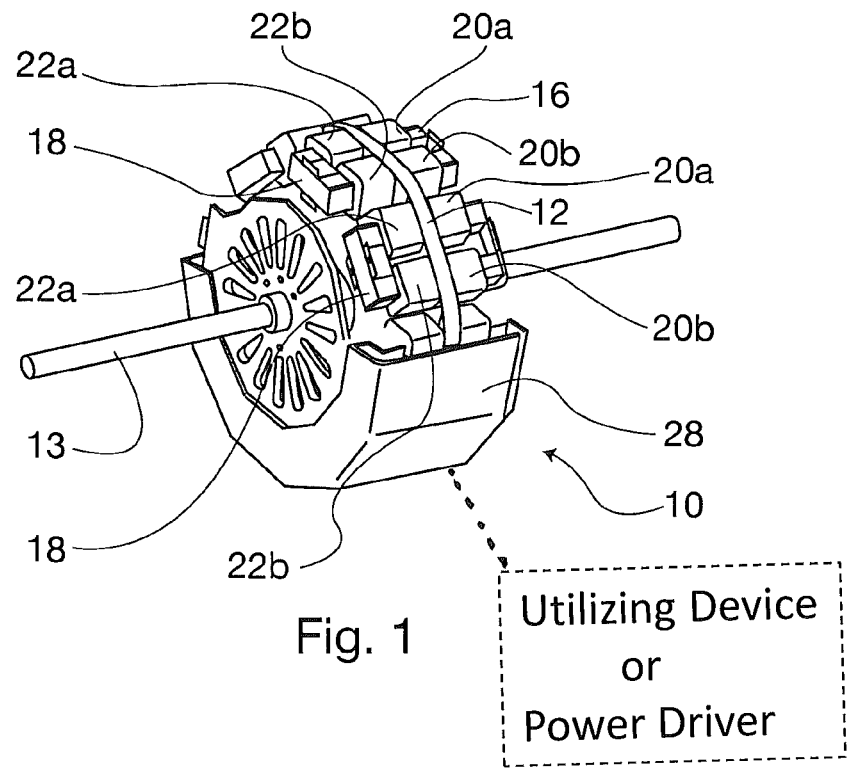
FIG. 1 is a perspective view of a first embodiment of the device according to the invention, with axial mounting.
Figure 2:
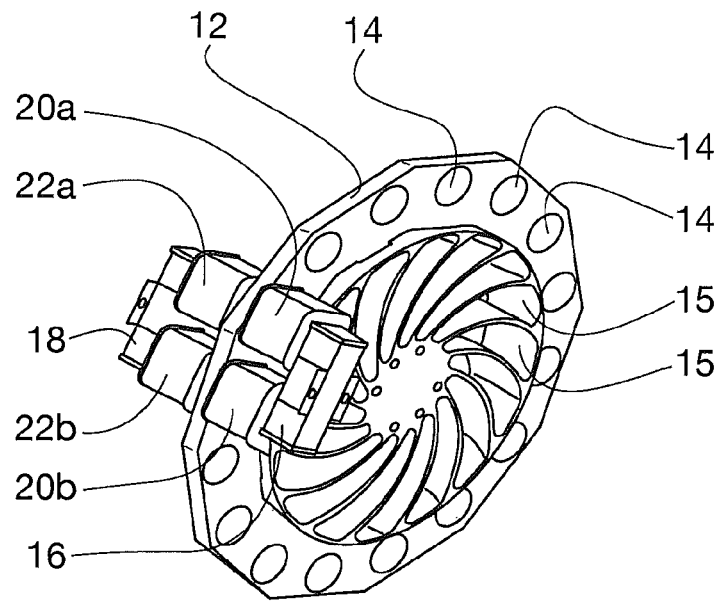
FIG. 2 is a perspective view of the rotor of the device shown in FIG. 1, with a pair of yokes and the associated coils.
Figure 3:
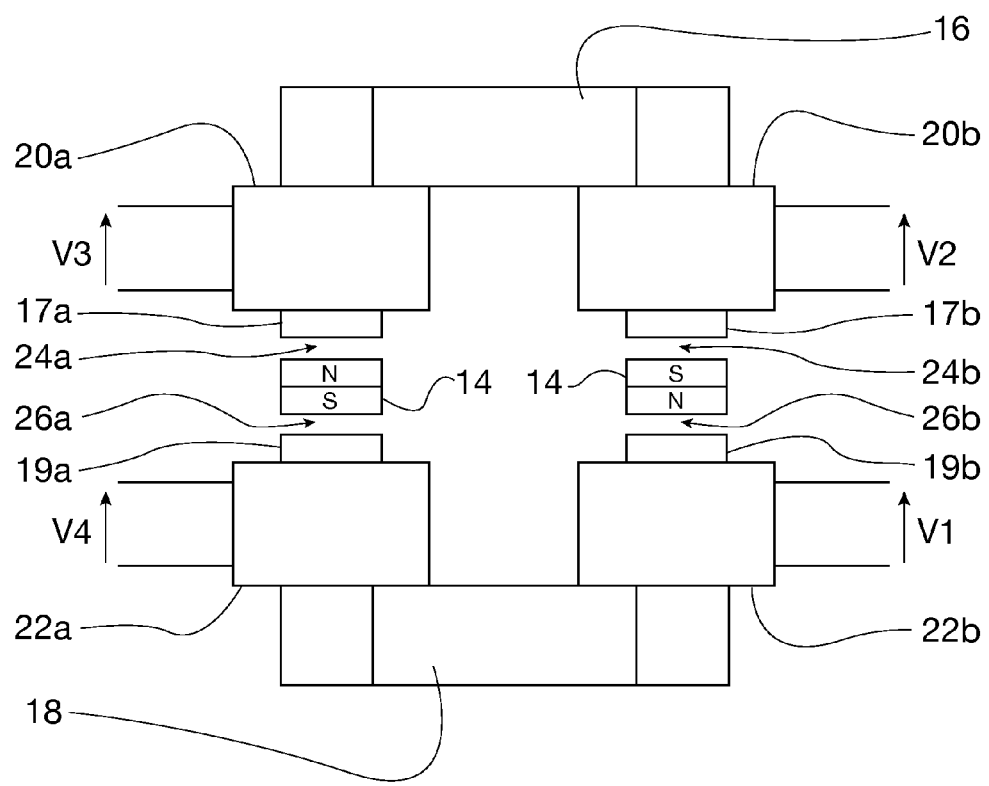
FIG. 3 is a schematic representation of a magnetic circuit.

Referring to FIGS. 1 to 3, there is shown a first embodiment of the device according to the invention, generally indicated by reference numeral 10, intended to build an axial machine.

Device 10 mainly comprises two distinct structures.

The first structure is a disc or a ring 12 (for sake of simplicity, herein below reference will be made to a disc), which forms the rotor of device 10 and is mounted on a shaft 13. The main surfaces of disc 12 bear a ring of identical permanent magnets 14 distributed in regular manner along its circumference, near the outer disc edge. Magnets 14 are arranged so as to form, on each surface of disc 12, a succession of alternately opposite poles. In the embodiment shown in FIGS. 1 to 3, disc 12, in the areas not occupied by magnets 14, is made of non-ferromagnetic material.

The central portion of disc 12 is formed with a plurality of blades 15 having propulsive function and conveying cooling air towards magnets 14 as well as towards coils, discussed below, for collection/supply of electric power generated by the device or intended for it.

Magnets 14 may have circular cross section, as shown in FIG. 2, or a different curvilinear cross-section, or yet a polygonal cross section, either convex (in particular square or rectangular) or concave.

Advantageously, the magnets are made of a material with high field intensity (e.g. about 1.5 Tesla with today's technology). The choice of the material will depend on the kind of application and hence on the operating conditions, in particular on the temperature of the operating environment. Materials commonly used in such machines are NdFeB, enabling operation at temperatures up to 150° C., or Sm—Co (or generally rare earth-cobalt), enabling operation at temperatures up to 350° C., or AlNiCo, enabling operation at temperatures up to 500° C. Depending on the materials, magnets 14 can consist of magnetised areas of disc 12, or they can be magnetic bodies inserted into seats formed in the disc.

The second structure consists of two sets of magnetic yokes 16, 18 that are arranged in a respective ring around disc 12, symmetrically thereto, and form the stator of the device. In the illustrated example, magnetic yokes 16, 18 are distributed in regular manner around disc 12, in front of magnets 14. The yokes have substantially a C or U shape, or generally a concave shape, open towards disc 12, with two substantially parallel arms or polar expansions denoted 17a, 17b for yokes 16 and 19a, 19b for yokes 18 (see FIG. 3). Arms 17a, 17b and 19a, 19b bear coils 20a, 20b and 22a, 22b, respectively, of electrically conductive material (e.g. copper or aluminium, the latter being preferred in aeronautical applications due to its lower specific weight), with respective individual connections either to utilisation devices of the generated electric power or to power supply devices (more particularly, a pulse generator or brushless power driver), depending on the conditions of use of the device. Advantageously, coils 20, 22 can be made of a thin sheet wound on the respective arm, to reduce hysteresis losses, Foucault currents on the horizontally exposed surface and skin effect. Of course, opposite coils are connected with opposite polarities.

Like magnets 14, arms 17a, b, 19a, b of yokes 16, 18 may have a circular cross section or a different curvilinear cross-section or yet a polygonal cross section, either convex (in particular square or rectangular) or concave. Non-regular shapes of the magnets and/or the yoke arms and/or different cross-sectional shapes for the magnets and the yokes can also assist in reducing cogging which, as known, is on the contrary favoured by strongly symmetrical structures. Whatever the cross sectional shapes of the arms and the magnets, it is important that the areas thereof have sizes that are similar or substantially the same. The similarity or substantial equality of the sizes of the areas of the magnets and the arms is necessary to ensure uniformity of the flux density circulating in yokes 16, 18 and magnets 14.

Figure 4:
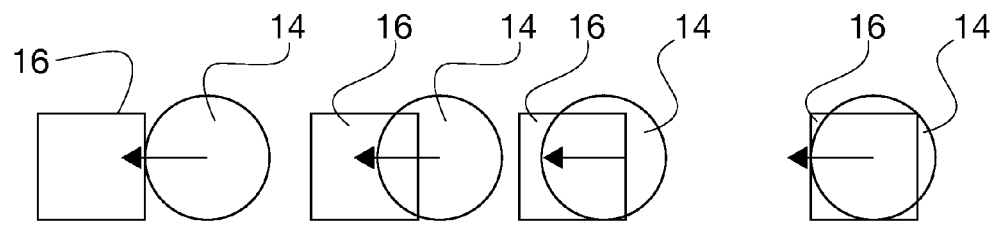
FIG. 4 is a schematic representation of the spatial relationship between magnets and yokes during rotation of the rotor.

By using magnets and arms with circular cross sections, a sinusoidal behaviour of the overlap of the facing surfaces of a magnet and an arm (see FIG. 4) is obtained while the rotor is rotating, and this, in case of use of the device as a generator, will result in an almost pure sinusoidal electromotive force (emf). Considerations of commercial availability of the components and of reduction of the cogging could however lead e.g. to using magnets with circular cross section and yokes having arms with square cross section, the side of which is substantially equal to the magnet diameter. In this case the emf generated will still be almost sinusoidal, with some higher order harmonics that however do not substantially cause losses, taking into account the large bandwidth of the materials utilisable for constructing the yokes. Note that, taking into account the transverse sizes that can be assumed for the magnets and the arms (e.g. a few centimetres), the requirement of similarity of the magnet and arm areas is still met.

By considering, for sake of simplicity of description, magnets and arms with the same circular cross section, and denoting by D their diameter, in order to ensure the symmetry of the produced waveform it is necessary that the arms of each yoke 16, 18 are spaced apart by a distance D, so that the length of each yoke is 3D. In correspondence of yokes 16, 18, rotor 12 will therefore have a circumference whose length is 4D·N, where N is the number of yokes in a ring. Thus, it is possible to build rotors enabling mounting the desired number of yokes or, conversely, the number of yokes will be imposed by the rotor size. Moreover, for a given rotor diameter, it is also possible to vary the number of yokes by varying the diameter of the circumference defined by the yokes and the magnets (i.e., in practice, by varying the distance of the magnets from the edge of rotor 12).

Number M of magnets 14 is related with number N of the yokes and depends on the kind of device that is to be built. For a synchronous machine, relation M=2N applies, so that the distance between subsequent magnets 14 is equal to their diameter D and, in a static configuration of device 10, a pair of subsequent magnets 14 can be located exactly in front of both arms of a yoke 16 or 18. On the contrary, in case of an asynchronous machine, relation M≠2N applies, M being an even number, and the distance between subsequent magnets 14 is smaller or greater than D, depending on whether M>2N or M<2N.

The arms of yokes 16, 18 end with plane surfaces parallel to the surfaces of rotor 12 and magnets 14. Each pair of yokes 16, 18 forms a magnetic circuit with a facing pair of magnets 14, which circuit is closed through the air gaps separating the yokes from the magnets. A pair of yokes 16, 18 with the respective coils 20, 22 will also be referred to hereinafter as "magnetic pliers".

As better shown in the diagram of FIG. 3, the ends of arms 17a, b, 19a, b of yokes 16, 18 are slightly spaced apart from the facing poles of the respective pair of magnets 14, thereby forming air gaps 24a, 24b and 26a, 26b, respectively, intended to enable on the one side disc rotation, by avoiding the contact between magnets and yokes, and on the other side desaturation of the magnetic circuit. Since rotor 12 and stator 16, 18 have plane surfaces, mechanical machining allows obtaining very small air gaps and hence high efficiency. Note that, for sake of clarity, the spacing between the yoke arms has been exaggerated in the drawing.

Turning back to FIG. 1, an external casing 28, made so as to enable passage and rotation of shaft 13, keeps the rotor and the stator of device 10 assembled. Moreover, the yokes are mounted onto individual supports, not shown in the drawing and discussed in more detail later on, enabling an independent adjustment of the positions of yokes 16, 18 relative to magnets 14 through a translational movement along three orthogonal axes x, y, z and a pivotal movement, indicated by arrows $\Omega 1, \Omega 2, \Omega 3$, about the same orthogonal axes (see FIG. 24).

This allows an easy mounting of the yokes and an optimisation of their positions when assembling the device, as well as a maximisation of the efficiency of the device.

The possibility of independent adjustment of the axial positions of the yokes allows not only minimising the widths of air gaps 24, 26 so as to maximise efficiency, but also changing such air gaps during operation, for adapting the action of the magnetic pliers to the requirements of the different operation phases, as it will become apparent from the description of some applications of the invention. Moreover, in case of a device having both generator and motor modules, at the start up, the generator function may temporarily be disabled or adjusted to a limited value in order to facilitate starting, whereas the motor modules can be brought closer in order to increase acceleration. Furthermore, an increase of the air gap can be exploited as a safety feature in case of overheating: such increase in the air gap causes an increase of the circuit reluctance, so that the concatenated voltage in the coils, and hence the temperature, is reduced. In general, it is possible to exclude one or more yokes that do not operate properly, while the rest of the device continues operating.

The possibility of an adjustment in a plane perpendicular to the rotation axis also is a safety feature that can be used in alternative to increasing the air gap in case of overheating: indeed, also the loss of alignment of yokes and magnets causes the increase of the circuit reluctance leading to the reduction of the concatenated voltage and hence of the temperature in the conductors.

Moreover, in case of machines intended to generate an almost constant power with important variations in the number of revolutions, the capability of radially and axially adjusting the positions of the yokes can be exploited to adjust the value of the concatenated power.

Advantageously, as it will be discussed later on, the stator supports include rolling devices, such as rollers or balls, arranged to roll on the outer perimeter of disc 12 to allow keeping air gaps 24, 26 between yokes 16, 18 and magnets 14 constant and compensating for axial and radial oscillations of rotor 12 as well as for thermal expansion. This is of particular interest in large-size machines, where radial or axial displacements, oscillations, resonance and mechanical and thermal deformations of the rotor can be important.

Each yoke with its coils, its supports and the means controlling the support displacements, including any necessary position and temperature sensor, can be considered as an elementary stator cell that is replicated to form the whole device, which thus has a modular structure. Thus several different arrangements can be easily obtained, as it will become apparent from the rest of the description.

The material of magnetic yokes 16, 18 can depend on the applications of the device.

For high frequency applications, the preferred materials are high permeability, low residual flux and low magnetic reluctance ferrites (ferroceramic materials). Use of ferrites is advantageous for the following reasons:

- ferrites allow high flux density (about ½ Tesla);
- ferrites are materials that can be sintered, and hence they allow making structures and shapes suitable for maximising efficiency;
- ferrites exhibit efficiency curves the maxima of which fall within a broad frequency range, even up to some Megahertz, and hence are perfectly compatible with the frequencies of passage of the magnets in the applications envisaged for the invention;
- given the high electrical resistivity of the material forming the ferrites and the low value of residual magnetisation with narrow hysteresis cycle at high frequencies, very low losses in the ferroceramic material and very low electromagnetic losses occur, whereby the efficiency is increased;
- ferrites enable converting the energy deriving from spurious harmonics of the waveform, this being especially useful for applications where great diameters and high numbers of revolutions are required;
- ferrites have a low specific weight (about half that of iron), this being of importance in aeronautical applications;
- ferrites have a capability of self-protection in the case of over-heating, because of the low Curie temperature Tc, around 250° C. As known, the magnetic permeability of the ferrites at temperature exceeding Tc is substantially 0 (see FIG. 25): thus, if the yoke temperature reaches Tc, the overall reluctance of the circuit considerably increases and takes a value substantially corresponding to that of a circuit in air, so that the concatenated voltage decreases to very low values. This property can be exploited as an alternative to the yoke displacement.

At relatively low operating frequencies, from some Hertz to some Kilohertz (e.g. up to 3 KHz), the yokes can be made of iron-silicon sheets, e.g. with a thickness of 5 or 10 hundredths of millimetre. For frequencies from 1 KHz to some ten KHz (e.g. up to 20 KHz) an Ni—Zn ferrite, such as N27 produced by EPCOS, can be used instead. Ni—Zn materials are characterised by high operating temperatures, very high resistivity (of the order of 100 kΩ/m) and limited hysteresis losses. Also Mn—Zn ferrites, such as the Ferroxcube materials mentioned above, e.g. MnZn 3C90-6, or Mn—Ni materials can be suitable.

The device according to the invention can act as a wireless generator and a brushless motor.

In order to disclose the operation principle of device 10 as a generator, it is suitable to recall the operation principle of a transformer. In a transformer, a dynamic variation of the voltage across the electric circuit of the primary winding causes a flux variation in the coil through which current flows, which variation is induced on the whole closed magnetic circuit. The flux variation in the closed magnetic circuit originates a secondary efm, proportional to the number of concatenated turns, in the secondary winding.

In the case of the invention, the flux variation occurs by making disc 12 with magnets 14 rotate between magnetic yokes 16, 18. In such case, a pair of facing magnetic yokes 16, 18 receive the flux variation due to the alternate passage of permanent magnets 14 with opposite polarities between the same yokes, thereby inducing, across coils 20, 22, efm's originating voltages V1 to V4 (FIG. 3). In other words, by applying a rotary torque to disc 12, an efm is induced in each coil 20a, 20b and 22a, 22b, respectively, concatenating the flux variations due to the alternation of the polarities of permanent magnets 14. By looking at the relative positions of magnets 14 and of the facing surfaces of the yokes in a ring, e.g. yokes 16, shown in FIG. 4, it can be seen that during rotation of rotor 12 the facing areas progressively overlap resulting in a substantially sinusoidal increase of the flux and hence of the induced voltage.

Voltage $-\Delta\Phi/\Delta t$ generated, where $\Delta\Phi$ is the magnetic flux variation and $\Delta t$ is the time elapsing between the passage of two magnets in front of a yoke arm, depends on the size of rotor 12, number M of the magnets (hence, number N of dipoles) and the peripheral rotor speed. With large rotor discs, allowing a high M, a high frequency of magnet passage, and hence a high voltage, can be obtained even with relatively low rotation speeds.

More particularly, in case of a synchronous machine, each coil 20, 22 generates a waveform in phase with the waveforms of the other coils and forms an independent generator. As known, depending on whether the coils are connected in series or in parallel, a voltage 2N times that of a single coil but with the same current or, after rectification, a current equal to the current sum but with the same voltage, respectively, can be obtained. In this second case, a suitable filter can be required.

In case of an asynchronous machine, each coil generates an efm that is phase shifted by $\pm 2\pi/2N$ relative to the adjacent coil and, in one period of rotation of disc 12, after rectifying the waveform, 4N half waves will be obtained with a ripple factor that is 4N times smaller than that of a single-phase waveform, so that no filtering and smoothing operations are required. Note that, in the asynchronous machine, the number of magnets and yokes will advantageously be such as to produce a sinusoidal waveform or the like (i.e., the combination M=N will be avoided).

In order to evaluate the performance of the device, reference is made to the following example concerning an aeronautical application. It is assumed that the ring of magnets 14 has a radius of about 1 m and the magnet pitch is about 10 cm (hence D is about 5 cm). Being the circumference somewhat longer than 6 m, the ring can comprise about sixty magnets 14. If the device is mounted on a compressor stage in a turbine, the rotation speed is generally about 12,000 rpm, i.e. 200 rps. Consequently, the frequency of magnet passage is about 12,000 Hz and Δt is about 80 μs. Since the shorter transition time Δt, the higher the induced voltage, energy characterised by high voltage with high frequency and low current will be produced. This feature affords further advantages, since high voltages and high frequencies enable using copper wires with reduced cross-sectional size for coils 20, 22 and, moreover, ferromagnetic materials for energy handling and conditioning become very small: this results in a weight reduction, which is particularly important for many applications, as it will become apparent hereinafter.

Device 10 can be used in reversible manner as a brushless motor by applying a voltage variation with phase rotation. The resulting polarity inversion induces a force onto permanent magnets 14, which consequently make disc 12 rotate. In such case, the voltage applied to the coils creates a pair of fluxes with opposite polarities, making the disc move to allow magnets 14 to be positioned opposite yokes 16, 18 in lined-up manner and with opposite polarities. In case of a synchronous motor, a progressive phase increase is to be caused on all coils to start the motion. In case of an asynchronous motor, the control is simplified thanks to the phase shift between the rotor and the stator resulting from the construction, and it will be sufficient to unbalance any of the coils to make the machine rotate.

Like in conventional brushless motors, the positions of magnets 14 relative to stator 16, 18 are detected. Thus, as soon as the system reaches a stability condition, the control circuitry starts a phase rotation which causes the rotor to displace again to search a new stability point. By progressively increasing the frequency of such control pulses, a rotor acceleration is caused.

The main features, in case of operation as a motor, are:
high acceleration torque: indeed, the force is applied to the periphery of disc 12, which can have a great radius (torque arm); as said, a great radius allows mounting a great number of magnetic dipoles cooperating in operating the motor, and hence results in a high overall force;
high number of revolutions, depending on the excitation frequency of the device (see for instance the considerations about the performance made in connection with the operation as generator).

Moreover, as said for the generator, since the rotor and the stator are two parallel surfaces, the mechanical machining allows obtaining very small air gaps and consequently high efficiency.

Note that, thanks to the modular structure of the device and to the independence of the various magnetic circuits, the generator and motor functions can be simultaneously present in a same device, in particular alternate cells can act as a generator or as a motor. The generator cells can thus be used as position detectors to provide the feedback for the motor function. Actually, a generator cell supplies a voltage that is proportional to the position of the magnets passing in front of it and, being the relative position of the generator and motor cells known, the rotor position relative to the generator and a motor cell can be immediately obtained. This allow adjusting the pulse for the motor cell so that it has the precise phase required to obtain the motion in a brushless machine.

In the alternative, the position feedback could be provided also by Hall effect detectors or by an ancillary winding: however, taking into account that Hall effect detectors do not properly operate at temperatures exceeding 150° C., the latter solution could be preferable.

Figure 5:
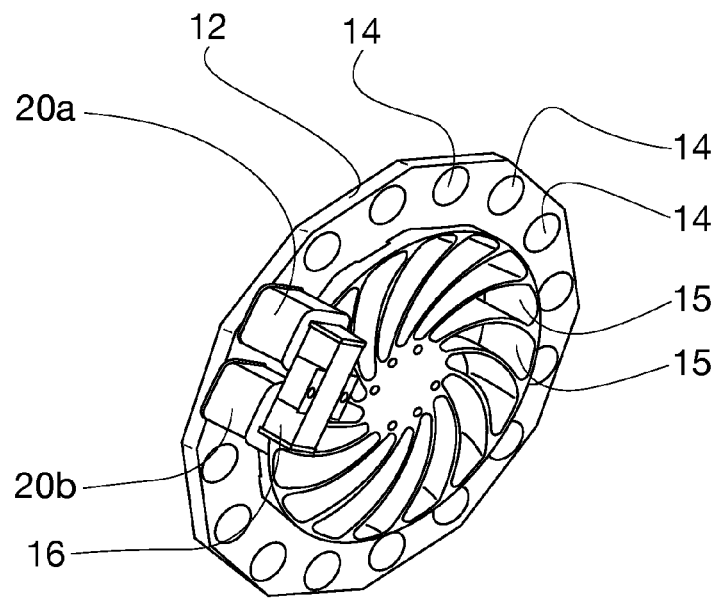
FIGS. 5 and 6 are views similar to FIGS. 2 and 3, relating to a variant of the axial-mounting embodiment.
Figure 6:
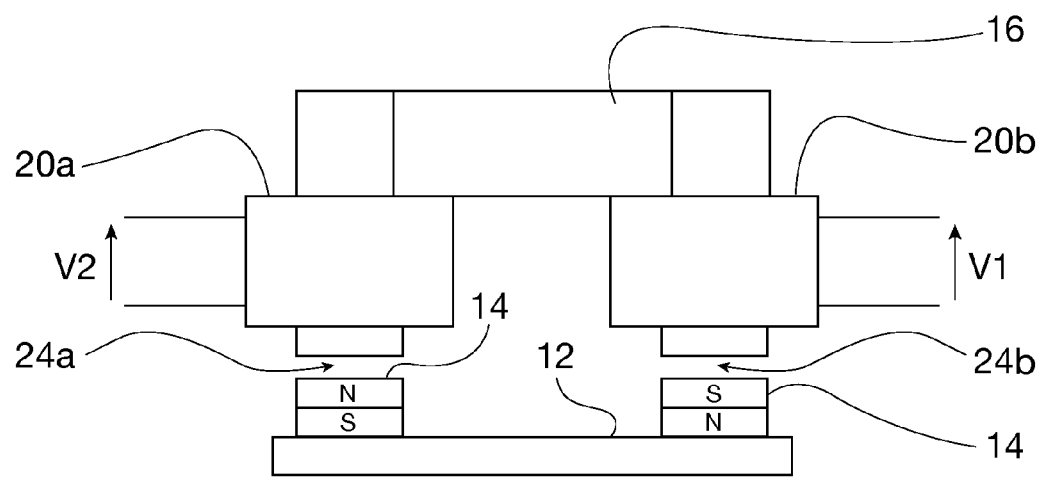

FIGS. 5 and 6 are representations similar to FIGS. 2 and 3, relating to a variant embodiment in which rotor 12 is made of a ferromagnetic material. Identical elements in both pairs of Figures are denoted by the same reference numerals. In this case, the stator comprises a single ring of yokes 16, with respective coils 20a, 20b, located opposite magnets 14 that, in turn, are glued to the surface of rotor 12 facing yokes 16 (see FIG. 6). A suitable material for gluing magnets 14 to rotor 12 is for instance loctite hisol 9466. Moreover, in order to make gluing easier, rotor 12 can be equipped with a guide of aluminium or resin (not shown), capable of defining the positions of magnets 14 and having containment, strengthening and desaturation functions. Should gluing be not sufficient to withstand the effects of centrifugal forces at high rotation speeds, other measures of keeping the magnets in position can be taken, as it will be disclosed further on. In this embodiment, the magnetic circuits are closed between a pair of magnets 14 and one yoke 16 through disc 12 and air gaps 24a, 24b. More particularly, as shown in FIG. 6, a magnetic circuit comprises: the N pole of a first magnet 14; air gap 24a; yoke 16 with coils 20a and 20b; air gap 24b; the S pole of a second magnet 14; the N pole of the second magnet; disc 12; the S pole of the first magnet. The operation principle of this variant embodiment is the same as that of the embodiment shown in FIGS. 1 to 3, the difference being only related with the different number of coils.

By connecting the magnets facing a same yoke by thin ferromagnetic sheets for closing the magnetic circuit between the arms of a yoke and a pair of magnets, the embodiment with a single yoke ring can also be used in case of a rotor made of non-ferromagnetic material.

This variant embodiment enhances the lightness characteristics of the device.

Figure 7:
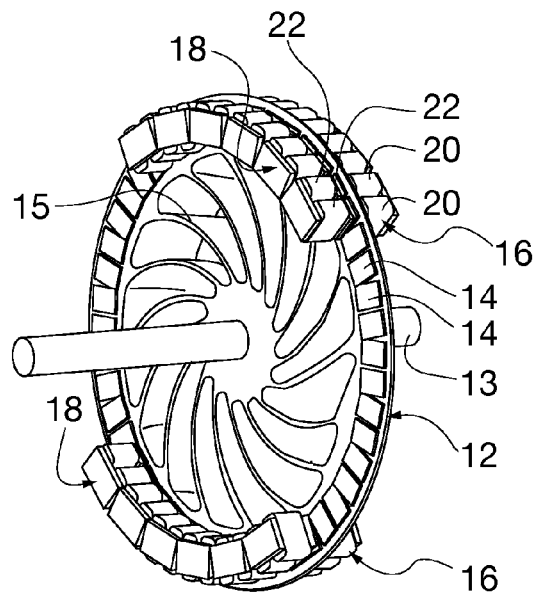
FIG. 7 is a schematic view of a variant of the embodiment of FIGS. 1 to 3, with yokes located in front of discrete sectors only of the magnet ring.
Figure 8:
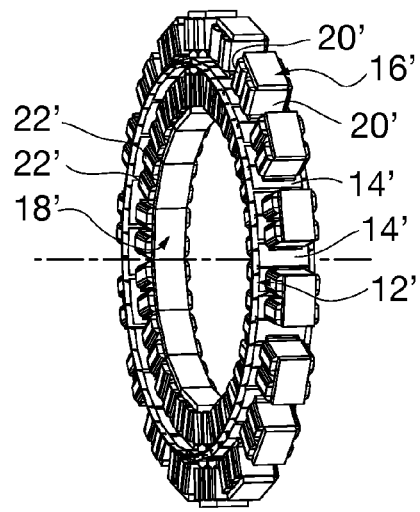
FIGS. 8 to 12 are schematic views of a number of embodiments with radial mounting of the magnets and the yokes.

FIG. 7 shows another variant embodiment in which yokes 16, 18 are not distributed along the whole circumference of disc 12, but only along one or more discrete arcs thereof, two in the illustrated example. The possibility of having reduced yoke sets is one of the advantages afforded by the modular structure of the invention. Each set can even include a single yoke. This variant embodiment is suitable for applications in which the powers (for both the generator and the motor functions) obtained by a set of elementary cells extending the whole circumference would be excessive. Of course, even if this variant has been shown for a device of the kind shown in FIGS. 1 to 3, with a yoke set on each side of rotor 12, it is applicable also to the case of a single yoke set shown in FIGS. 5 and 6.

FIGS. 8 to 12 relate to an embodiment of the invention with a radial arrangement of the magnets and the yokes. Elements already discussed with reference to the previous Figures are denoted by the same reference numerals, with the addition of a prime.

Figure 9:
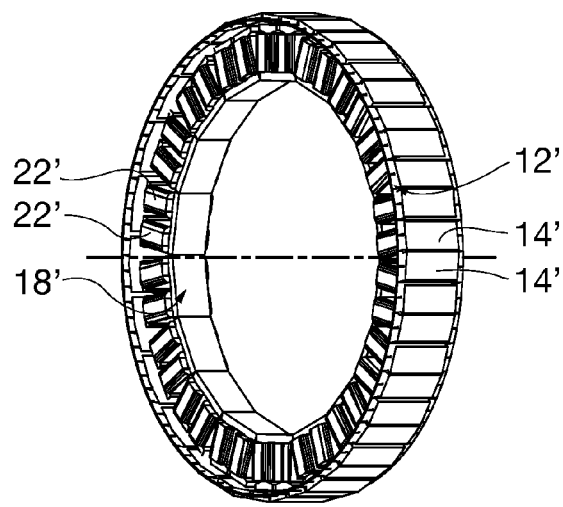
Figure 10:
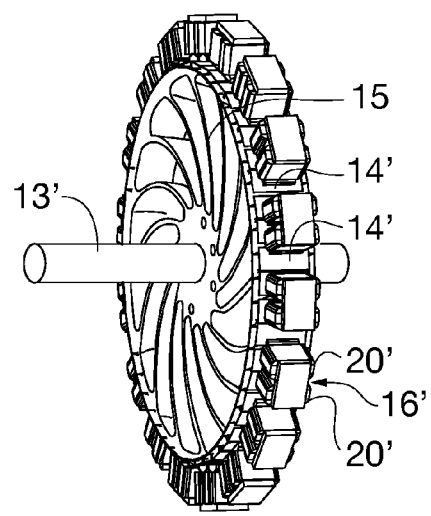

In the radial embodiment, rotor 12' is a cylindrical body bearing magnets 14' with alternate orientations on its side surface. Like in the axial embodiment, two sets of yokes 16', 18' (FIG. 8) or only one set 16' or 18' (FIGS. 9 and 10) can be provided, depending on the material of rotor 12'. The yokes have radially directed arms on which coils 20', 22' are wound. In the solution with a single yoke set, the yokes may be located either externally or internally of rotor 12', as shown in FIGS. 9 and 10, respectively. The arrangements shown in FIGS. 9 and 10 will be referred to as "internal rotor" and "external rotor" arrangements, respectively. In the radial embodiment, facing surfaces of the rotor and the yoke arms will have the same curvature at any point, to ensure the constancy of the air gap.

In the external rotor arrangement and in the arrangement with a double set of yokes, rotor 12' is formed on the surface of a large hollow cylindrical chamber within which the or one set of yokes is mounted. In the internal rotor arrangement, rotor 12 will still be a ring or disc carried by a shaft 13'. Also in the radial embodiment, yokes 16' and/or 18' can be distributed in front the whole ring of magnets or in front of one or more arcs only of such ring.

Figure 11:
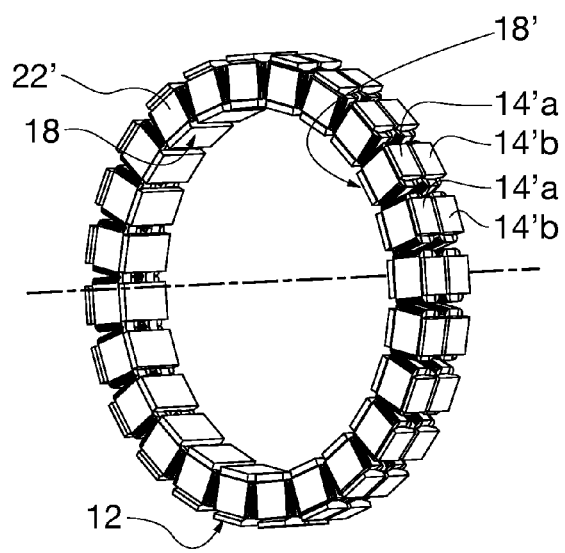
Figure 12:
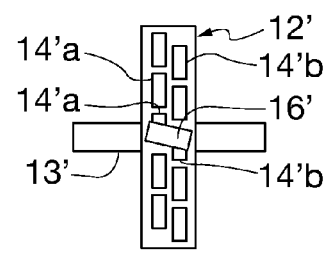

In the variant shown in FIGS. 11 and 12, the side surface of rotor 12' can bear two adjacent and parallel row of magnets 14'a, 14'b (twin magnet arrangement), a magnet in one row having opposite orientation with respect to the adjacent magnet in other row. The arms of a yoke 16' and/or 18' face one magnet 14'a, 14'b in each ring. As shown in FIG. 12, yokes 16' (only one is shown) can be arranged obliquely with respect to the generatrices of the rotor ring and the two magnet rows are then shifted relative to each other so that also a magnet pair 14'a, 14'b facing a same yoke is obliquely arranged with respect to the generatrices of the rotor ring. This feature also contributes to reduce cogging.

It is to be appreciated that, in the twin magnet arrangement, the magnet pairs are always in the same radial plane passing through both yoke arms, in both the synchronous and the asynchronous configuration, and the rotation planes are always common to both the magnets and the yokes. In such case, the magnetic flow either is present on the yoke arms since the magnets are in front of the yokes, or no flow circulation takes place since no magnet is in front of a yoke. This affords the important advantage that spurious Foucault losses (i.e. a flow is still present in one arm of a yoke and gives rise to a dispersion towards the rotor through the other arm) are eliminated, since there is no phase shift between the arms. In all other arrangements, on the contrary, there is always a little phase shift between a plane passing through the transversal axis of the magnet and the planes radially crossing the yoke arms, since the arms lie in planes mutually phase shifted by a certain angle: thus, a certain spurious Foucault loss is always present.

All considerations about the yoke adjustability made hereinbefore in respect of the axial arrangements apply also to the radial arrangements, taking into account that the air gap is now a radial gap instead of axial one. For instance, in order to adjust the concatenated power, a radial displacement of the yokes allows varying the air gap and longitudinal displacement of the yokes relative to the rotation axis allows varying the areas over which magnets and arms overlap.

Note that, even if the twin magnet row and the oblique arrangement of the yokes relative to the magnets have been shown only for one of the radial arrangements, they could be adopted also for the other radial arrangements disclosed here as well as for the different variants of the axial arrangement.

In the embodiments described up to now, it has been assumed that the coils of a yoke are independent from one another and from the coils of the other yokes, and are individually connected to the power driver or the utilising device. A high number of cells would entail a high number of connections to the outside, namely at least two connections for each coil, and this can be a drawback in terms of complexity of the device. The modular structure of the device can be exploited to reduce the number of outside connections, while still having independent coils on each arm. Looking at the geometrical aspect of the device, in a machine with N yokes (and hence P=2N arms or polar expansions) and M magnets, it can be generally observed that a given geometrical phase between the poles and the confronting magnets occur with a periodicity of X polar expansions, with:

$$X=P/gcd(P, M)$$

where the abbreviation "gcd" stands for greatest common divisor. Each coil in a group of X coils generate efm's phase shifted with respect to the other coils in the group, and the electrical phases of the coils are identically repeated in all groups. Coils with the same phase may be connected together in parallel or in series or with a star, triangle ... configuration inside the machine, and their common points will be connected to the outside. Thus, the number of outside connections is reduced to the number of different phases. A modular multiphase machine is thus obtained, where each module includes X polar expansions and Y=M/gcd(P, M) magnets. It is also possible to connect to the outside the coils of alternate modules with inverted phases, so that an X-phase or a 2X-phase machine can be obtained with a given pair of values M, P. Of course, when the modular multiphase arrangement is applied to the twin magnet embodiment, the advantage of the synchronous flow in both arms of a cell is still maintained. By connecting in parallel or in series modules with the same phase it is possible to increase or reduce at will the voltage, whereby the same result afforded by the yoke displacement is achieved.

Figure 13:
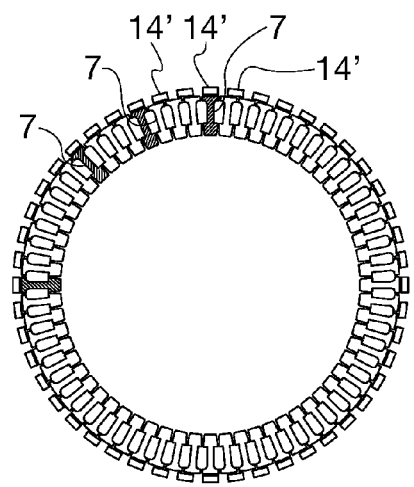
FIGS. 13 to 15 are schematic views showing a number of magnet and yoke patterns used in multiphase machines.
Figure 14:
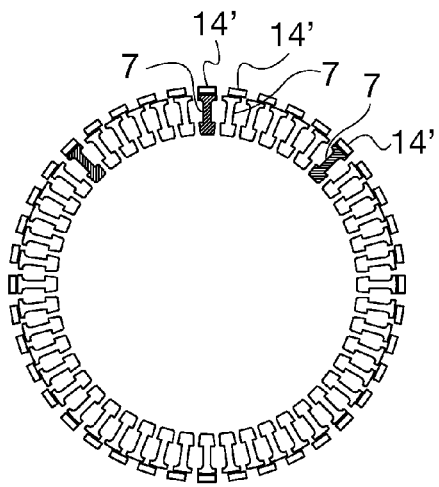
Figure 15:
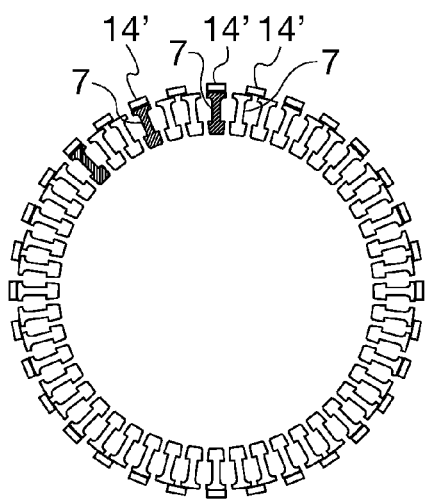

FIGS. 13 to 15 show some exemplary arrangements with different pairs of values P, M, where M is an even number lower than P−2. The Figures refer to the radial embodiment, but of course the same considerations apply to the axial embodiment.

In FIG. 13, P=64 and M=48, so that X=4. This allows obtaining machines with either four or eight phases, depending on whether the coils in every second group of four coils have the same phases or inverted phases with respect to the corresponding coils in the adjacent group of four coils.

In FIG. 14, P=48 and M=40, so that X=6. This allows obtaining machines with either six or twelve phases, depending on whether the coils in every second group of six coils have the same phases or inverted phases with respect to the corresponding coils in the adjacent group of six coils.

In FIG. 15, P=48 and M=32, so that X=3. Three-phase or six-phase machines can be obtained, depending on whether the coils in every second group of three coils have the same phases or inverted phases with respect to the corresponding coils in the adjacent group of three coils.

Other asynchronous configurations could be achieved with M even and greater than P.

This simplification of the external connections can be applied also in the case of the synchronous machine, where M=P, so that P coils with the same phase, or P/2 coils with one phase and P/2 coils with the inverted phase can be obtained, and one or two connections only to the outside is or are necessary.

Figure 16:
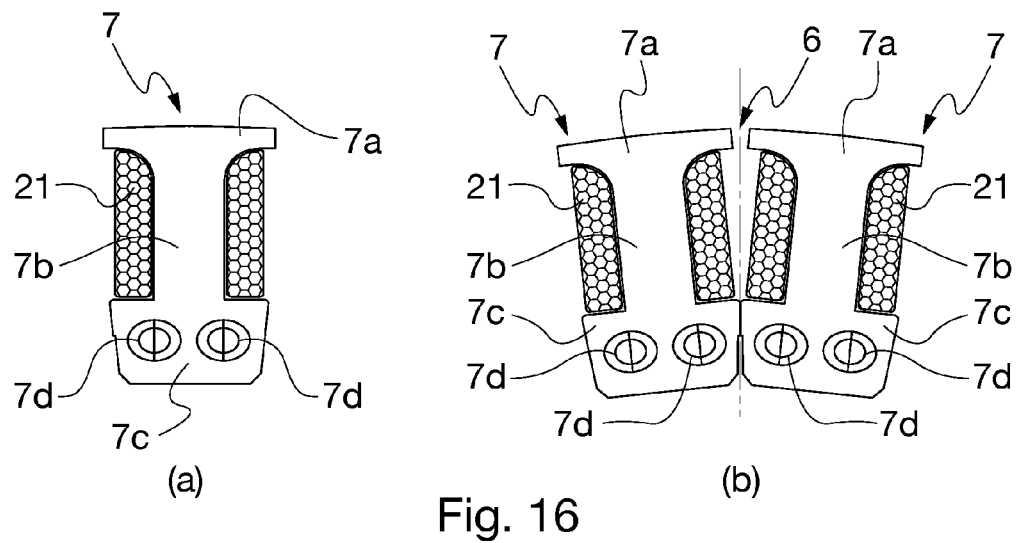

FIGS. 13 to 15 also show a shape of the polar expansions, denoted here by reference numeral 7, which is particularly advantageous for multiphase machines. Reference is made also to the enlarged views of FIGS. 16(*a*) and 16(*b*). Polar expansion 7 has an enlarged head 7a facing the magnets, an intermediate stem 7b with reduced cross-sectional size onto which the coil (denoted here by reference numeral 21) is wound and a base or foot 7c for securing polar expansion 7 to a support (e.g. the connecting member previously disclosed). This shape has the advantage that the active ferromagnetic section of the machine is enlarged while reducing the exposure of the coils to the rotating magnets. Stem 7b is substantially shaped as a rectangular parallelepiped, having the largest surfaces perpendicular to the direction of rotation of the rotor. Also foot 7c of the polar expansions can have larger size than stem 7b. Polar expansions 7 could be individually fastened to a stator support by fastening means 7d and as shown in FIG. 16(b), a yoke, denoted here by reference numeral 6, will comprise two adjacent expansions 7 joined in correspondence of their feet 7c. The individual mounting is advantageous in that it makes winding of the coils easier. Moreover, the side surfaces of feet 7c are slightly inclined, e.g. by a few degrees, so that a certain angle, open towards the rotor, exists between the axes of stems 7b in the yoke. The inclination of the axes of stems 7b in a yoke 6 provides space for winding coils of relatively great size.

A further solution for the reduction of the number of external connections when using the device as a generator could be rectifying the waveforms of all coils within the machine, and connecting in parallel the positive poles as well as the negative poles within the machine, so that only two output conductors are required. However, such a solution could make use of the machine as a motor impossible or extremely difficult, since all coils are connected together. However, the phase modularity disclosed with reference to FIGS. 13 to 15 could be exploited so as to leave some of the cells not connected to the rectifier structure and to use such cells for the motor function. For instance, considering a machine with 48 polar expansions, the following sequence could be envisaged: three polar expansions connected through the rectifiers and one polar expansion independent and reversible, whereby thirty-six polar expansions are directly rectified and connected together, and twelve independent polar expansions are distributed along the circumference with pitch X=4.

Figure 17:
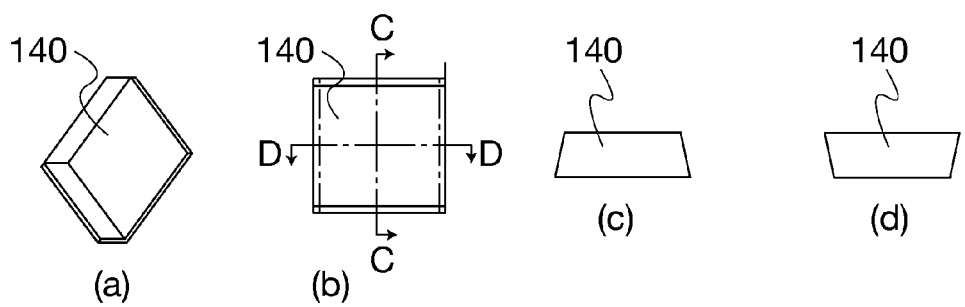

FIGS. 17(a) to 17(d) show a magnet embodiment suitable for withstanding the centrifugal force especially at high rotation speeds, such as those encountered when the magnets are mounted on the impeller of a turbine. The magnet is a quadrangular plate 140 whose bases form the N and S poles of the magnet and whose side surface has a double tapering: more particularly, two opposite sides of the magnet are tapered e.g. from top to the bottom, and the other two sides have the inverse tapering. In other words, the sections according to two planes perpendicular to one of the magnet bases, such as the planes passing through lines C-C and D-D in FIG. 17(b), are two inverted trapeziums, as shown in FIGS. 17(c) and (d). Such a shape enables transferring the tangential or radial compression stresses in order to exploit the high resistance to compression.

If necessary, in case of magnets adjacent to each other, retaining elements (not shown) having a complementary tapering to the facing sides of the magnets can be provided between adjacent magnets transversally to the magnet ring and, in case of the twin magnet arrangement, also longitudinally between the magnets in the two rows.

Note that, in a variant of the embodiment of FIGS. 17(a) to 17(d), only one pair of opposite side faces could be inclined, so that the plate is substantially wedge-shaped. Also, the same effect of a wedge-shaped or doubly tapered plate could be obtained by plates shaped as frustums of cones or pyramids.

As shown in FIG. 18 for an external rotor radial device using yoke 6 of FIG. 16(b), the resistance to the centrifugal force may be enhanced by the use of a tangentially operating resilient retaining member 60 located between adjacent magnets 140 and arranged to apply a compression stress on the magnet sides to compensate dimensional variations due to tangential stresses. Member 60 can include for instance a leaf spring having a central portion 60a fastened to rotor 12' and two U-shaped side arms 60b extending from the central portion toward a respective magnet 140, so that the legs of the U remote from central portion 60a lean against the magnets. Clearly, either two rows of retaining members 60, one for each magnet row, or a single row of member 60 can be provided. FIG. 18 further shows that adjacent yokes 6 could be separated by a gap 77 providing a degree of freedom in respect of possible mechanical interferences due for instance to thermal expansion. The same effect could be obtained also by use of retaining members made of elastomeric material, e.g. Teflon®.

FIG. 19 shows a detail of an embodiment of internal rotor machine using wedge-shaped magnets 140 with strongly inclined walls. This solution is intended for vey high numbers of revolutions. Magnets 140 are housed in seats 62 formed in the rotor edge and having, e.g. in a plane perpendicular to the rotation axis of the rotor 12', a substantially trapezoidal cross-section, complementary to the corresponding cross-sectional shape of the magnets and are wrapped in a non-conductive sheet 66. The other two sides of magnets 140 engage with clamps 64 transversally retaining the magnets.

Note that FIGS. 18 and 19 refer to the twin magnet arrangement and also show thin ferromagnetic sheets 61 connecting magnets confronting a same yoke.

FIGS. 20 to 22 show a possible support structure for a yoke 16, enabling the cell displacement and the automatic compensation of deformations or variations in the position or attitude of the rotor. FIGS. 20 and 21 are two very schematic sectional principle views according to two orthogonal planes, and FIG. 22 is a perspective view in which, for clarity, some of the components shown in the sectional views have been omitted.

Such support structure comprise a number of rolling members 50 (four in the illustrated example, two for each arm, see FIG. 22), such as balls, rollers, roller or ball bearings etc. Those members are arranged to roll over a suitably processed peripheral area 51 of the rotor surface, acting as a track for the rolling members and serve for keeping constant the air gap. To this end, rolling members 50 are associated with mechanically, hydraulically or pneumatically operated adjusting units 52, e.g. hydraulic or pneumatic cylinders or sliding members, which, in a calibration phase of the device, are set so that, in normal operating conditions, rolling members 50 are spaced apart from rotor 12 and are brought in contact with rotor 12 only when the latter is displaced from its proper operating position or becomes deformed. Setting of rolling members 50 is such that they are somewhat projecting with respect to the arms, so as to leave a desired air gap when they are rolling over the rotor. Rolling members 50 and their adjusting units 52, together with yoke 16 they are associated to, are brought by a bearing structure 54, which is associated with compression springs 56, or other elements having the same functions, that are calibrated to contrast any displacement of the rotor leading to a variation of said desired air gap.

For giving solidity to the structure, the whole cell consisting of a yoke 16, 18 with its coils 20, 22, its supporting structure 54, the means causing the position adjustment and generally the yoke displacements described above and the detectors causing such displacements can be embodied in a resin layer, as shown at 70 in FIG. 23, possibly enclosed in a casing, not shown in the Figure. The resin can possibly be charged with powders of materials increasing electrical and/or thermal conductivity, such as boron, silicon carbide, aluminium or the like.

FIG. 27 shows a principle implementation of a cell and its means for the axial adjustment. The yoke, e.g. yoke 16, is equipped on its arms 17 with two power coils 20 and two signal coils 200, which are surrounded by cooling coils 80. The cell is further equipped with temperature and position detectors 86, 88 with the relevant signal processing and control circuits 90. For instance, temperature detectors 88 may comprise a thermo-resistor of the positive or negative thermal control type, or a thermocouple. As stated above, position detectors 88 (which term is meant to include also phase detectors and rotation frequency detectors) can be Hall effect detectors or ancillary coils or yet primary power coils utilised for detecting phases and amplitudes of the currents and the voltages in the coils of the various arms. Note that even if detectors 86, 88 have been shown outside the yoke for sake of an easier understanding, they will in fact be located internally of the cell, e.g. together with processing and control circuits 90 at the location shown for the latter.

Springs 56 contrasting the rotor displacements are mounted within actuating pistons or cylinders 82, slidably mounted within cylinders 92. In idle conditions of the device, pistons 82 are completely retracted within cylinders 92 by springs 84. In operating conditions, cylinders 92 cause extension of pistons 82 so that the latter take their steady working position. In case of dynamic adjustment, a suitable linear driver controlled by the electronic control unit of the device modulates the push applied to piston 82 depending on the operating requirements. By differently acting on the two pistons 82, tilting of the cell can be obtained. Of course, any hydraulically, pneumatically or mechanically operated device equivalent to the assembly of pistons 82 and cylinders 92 can be used.

Detectors 86, 88, processing and control circuits 90 and pistons/cylinders 82, 92 are connected to a central processor (not shown) which, based on the information received from the detectors and the model of the machine stored inside it, determines the actions to be taken for both the regular operation of the machine and the safety procedures. The displacement commands are sent through suitable power drivers and actuators of which pistons/cylinders 82, 92 or other adjusting units are the members connected to the cell.

Cylinders 82, 92 or equivalent units will be provided for controlling translation/rotation of the cell along/about the other axes.

A single rolling member 50 with its adjusting piston 52 has been shown, disassembled form the rest of the cell for sake of clarity of the drawing. Rolling member 50 is associated with shock-absorbing means, e.g. a spring 58, for compensating the impact of the rolling member itself against the rotor.

The described characteristics of lightness and high efficiency and, in case of use as a motor, of high torque, and the high performance, allow several applications for the device, such as for instance:
- turbine-mounted aeronautical generator;
- starting motor for a turbine;
- feedback motor for turbine architecture;
- motor for ship and aircraft propellers;
- aeronautical propeller for vertical take-off;
- motor for pumps for gas pipelines and the like;
- Aeolian generator;
- industrial generator in general;
- torque regulator;
- flywheel for automotive systems;
- electromagnetic brake with energy recovery;
- active brake.

Hereinafter, such applications will be shortly discussed.

Aeronautical Generator

This application arises from the need to generate electrical energy on board aircrafts. Device 10 can be directly mounted on the stages at low operating temperature (in such case, blades 15 shown in FIG. 2 will be the blades of the turbine stage) and allows replacing the conventional alternators receiving mechanical energy through a speed reduction gear connected to the turbine axis. The generator of the invention is therefore a solution in line with the modern technologies of electrical energy conversion by means of switched power supplies, which enable remote driving of actuators, devices and transducers through a completely electric distribution. Device 10, which is capable of generating electrical energy at high voltage and frequency, without direct contact with the turbine, enables eliminating many of the drawbacks of the conventional technique. In particular, it is lightweight and highly reliable, has a long life, has an easily expandable modular construction and requires minimum maintenance. Moreover, it is relatively cheap, in particular with respect to the cost of the motor and the gear box.

Starting Motor for Aeronautical Applications and for Turbines in General

The device according to the invention, being wholly reversible, allows providing also the starting system for the engines on an aircraft, without additional weight and costs, apart from those of the electronic control units for the brushless motor. On the contrary, the starting system often is not provided on aircrafts since it is heavy and expensive, so that the ignition phase is limited to the aircraft parking phases only, when an external motor can be used. This choice clearly limits the flexibility and safety of the aircraft itself. The same characteristics of lightness and limited cost also allow employing the invention as starting motor for turbines in general, also outside the aeronautical field.

Feedback Motor in Turbine Architectures

The low-pressure or high-pressure compressor is brought to a rotation speed that is no longer linked with the rotation speed of the turbine shaft, but is determined by the electric motor built around and externally of the compressor (overspeed). This enables optimising the number of revolutions and the pressures in the compressors independently of the turbine stages, and results in more adjustment possibilities for and in an optimisation of the performance and the consumption.

Motor for Ship Propellers

Electrical ship propulsion can make use of machines of the kind concerned by the invention since such machines have low noise, can be mounted externally to the hull and, being rigidly connected to the screw, they can be angularly displaced relative to the longitudinal hull axis, thereby providing for a high manoeuvrability of the ship. Use of the invention in such applications is shown in FIG. 26, where the twin-magnet radial embodiment of a device 10 according to the invention is shown integrated onto the periphery of screw 11 of a ship. The housing frame has been removed to show the arrangement of device 10. In such applications, the invention affords the following advantages:
- high torque in case of great radii and high number of poles thanks to the arrangement of the motor cells on the screw periphery;
- possibility of individual maintenance and adjustment of the cells;
- high reliability, since, even in case of failure of one cell, the other cells can continue operating independently of the failed one;
- possibility of operating in harsh and hostile environments, thanks to the sealing of the cells with the resin;
- high immunity to screw oscillations relative to the frame thanks to the peripheral rolling members the cells are equipped with, since the cells can pivot relative to the screw while keeping the gap constant.

Motor for Aircraft Propellers and Aeronautical Propeller for Vertical Take-Off

The advantages of high torque and high reliability make the use of the invention suitable also in aircraft propellers. The structure of an aircraft propeller using the invention is as shown in FIG. 26. In such applications, the device of the invention can work together with generator units associated with thermodynamic machines, with accumulators, fuel-cells, photovoltaic cells etc.

Moreover, since the screw and the ring of magnets/yokes can be oriented also in horizontal position, e.g. parallel to the wing surface, the possibility exists of generating a vertical flow for the vertical take-off; then, after the take-off, the assembly of the screw and the ring can be rotated to progressively pass to the horizontal flight. Use of the invention in such an application solves the problems related with the very high temperatures of the gas flows of the conventional turbines, which flows, in the vertical arrangement of the turbine, could damage the aircraft and the runways.

Motor for Pumps for Gas Pipelines and the Like

The application in this field is based on the same principles as that in ship propellers. In this case however the magnets are located inside the pipeline while the yokes are located on an external ring. In this manner the absence of any contact and the complete electrical insulation between the yokes and the propeller inside the pipeline are ensured. A high reliability and an intrinsic safety are thus achieved, which are particularly suitable for pumping gases and hydrocarbons.

Aeolian Generator

For such application, blades 15 in the central part of disc 12 will form the vanes of the Aeolian generator. This application is possible in that no problem exists in building large discs, capable of housing vanes with the sizes typical for such application, while keeping however a reduced weight. Thanks to the great number of dipoles that can be mounted on large disc and to the low losses of the magnetic circuit, a good efficiency can be achieved in any wind condition. The plurality of dipoles allows sizing the structure so as to optimise the trade-off between cost and performance.

Industrial Generator

The invention is suitable for use as a generator whenever a rotating shaft exists, since securing rotor 12 to the rotating shaft (which thus forms shaft 13 of the device) is easy, whereas the ring of magnetic pliers 16, 18 can be independently housed since it lacks any mechanical connection with the rotating member. The invention is particularly suitable for use in conjunction with turbines for energy production, since the elements forming device 10 can be easily integrated with the turbine itself.

D.c. Torque Regulator

This application demands that also the whole of yokes 16, 18 is rotatably mounted. If a constant polarity voltage is applied to device 10, magnets 14 are stably positioned in a balance condition in front of magnetic yokes 16, 18. Thus, by rotating the external portion bearing yokes 16, 18, a similar rotation is induced in rotor module 12 bearing magnets 14. This joint rotation of the stator and the rotor continues until attaining the maximum torque, which is given by the product of the tangential force jointly applied to the disc and the yokes by the arm (radius of the magnet ring), whereafter a constant torque sliding starts. In this case, if multiple revolutions at constant torque are required, it is necessary to provide a rotary collector to allow current flow during rotation.

By varying the voltage level, the concatenated force is varied until saturating the ferromagnetic circuit.

A.c. Torque Regulator

In this case the device according to the invention acts as described in connection with the motor: yet, at the end of a screwing stroke, the device stops and the applied torque is reset, like in the case of the d.c. torque regulator. In this case however rotary collectors are not required to allow current flow.

D.c. or a.c. torque regulators using the invention can be used for instance in machines for bottle cap screwing, which must operate with constant torque even when the thread is completely screwed. Such requirement is particularly severe in foodstuff field and in chemical-pharmaceutical industry.

Electromagnetic Flywheel

An important application of the invention is for recovering energy during deceleration, by converting mechanical energy into electrical energy, storing electrical energy into mixed accumulator systems (i.e., systems including devices operating in different times and having different accumulation and supply characteristics) and returning it, thanks to the device reversibility, as mechanical energy during the acceleration phase. The device substantially acts as an electromagnetic flywheel.

The structure of a system using the device according to the invention as an electromagnetic flywheel is schematically shown in FIG. 28.

In the structure, the electromagnetic flywheel, i.e. device 10, is mounted on the drive shaft between engine 30 and the load, upstream of gear box 32. Under such a condition, flywheel 10 is directly rotated at the same speed as the drive shaft (generally, approximately from 1,000 up to and beyond 20,000 rpm). Flywheel 10 can be arranged transversally of the motor axle, centrally on the car, thereby minimising gyroscopic effects, which however are low since the moving member (rotor) has a low momentum of inertia.

Flywheel 10 is connected on the one side to the units that, in the whole, form energy recovery assembly 33, and on the other side to the units that, in the whole, form energy supply assembly 35. Assemblies 33, 35 are connected to the input and the output, respectively, of accumulator 40 that, as said, can be a mixed accumulator system. Energy recovery assembly 33 comprises an inverter 34 that can be connected between flywheel 10 and a current generator 38 by brake control 36. Current generator 38 then supplies accumulator 40. Energy supply assembly 35 in turn comprises a phase regulator 42, connected to accumulator 40 and controlled by a flywheel position encoder 44, and brushless motor slaving units 46, that can be connected to flywheel 10 by accelerator control 48.

In idle condition (i.e. when brake control 36 is not operated), coils 20, 22 (FIGS. 1 to 3) are kept in open circuit condition and are moved away from rotor 12, thereby increasing the air gap in order to annul braking effects during normal run, so that the counter-electromotive feedback force is substantially 0. During braking or recovery phase, the electric circuit of the coils is closed on inverter 34 thereby making current flow and generating a counter-electromotive force on disc 12 of flywheel 10. Moreover, both rings of yokes 16, 18 are moved closer to disc 12 so that the device operates with the minimum air gap and hence the maximum counter-electromotive force. That force causes a reduction in the kinetic energy, thereby braking the vehicle and simultaneously generating high-frequency electric energy that is transformed by current generator 38 so that it can be stored in accumulator 40.

During acceleration, the reverse supply process is actuated. In this phase, the flywheel acts as a brushless motor. When accelerator control 48 is actuated, a voltage variation with phase rotation is applied and the polarity inversion then induces a force on permanent magnets 14 that make disc 12 rotate. For the rest of the operation, the considerations already made in respect of the operation as a motor apply. The present technologies also allow supplying high energy amounts in short time: this enables attaining, during the supply phase, very high acceleration torques and very steep curves for the motor response.

Electromagnetic Brake

A device 10 according to the invention, mounted between a thermodynamic engine 20 and transmission units 32 of a vehicle as shown in FIG. 28, may also act as an electromagnetic brake. In such an application, during normal operation, coils 20, 22 (FIGS. 1 to 3) are kept in open circuit condition and yokes 16, 18 are kept at a great distance from the rotor as in the above case, so that the counter-electromotive feedback force is substantially 0. When braking, the yokes are moved closer to the rotor as before, and the electric circuit of the coils is closed on a resistive load (instead of being closed on an inverter, as in the flywheel case), and the braking energy is transformed in thermal energy while a counter-electromotive braking force acts on the disc.

Active Brake

Another possible use of the invention is as an active brake. The principle is a development of that described for the flywheel, save that in the present case energy accumulation takes place also during the normal operation or run phase of the vehicle. During the braking phase, the circuit of coils 20, 22 not only is closed on a load, but is also driven so as to operate as a counter-rotating motor: energy then flows from accumulator 40 (FIG. 28) to the braking device, thereby reducing braking time. By arranging a device 10 on the axle of each wheel, wheel lock can also be avoided: when braking, the active braking action can be independently distributed to each wheel, thanks to the possibility of axially adjusting the relative position of the rotor and the stator, and a counter-rotating action can be provided in differentiated manner, suitable for compensating the unbalanced loads typical of an emergency braking. The general advantages of such an application are related with the high torque of the device, the intervention rapidity and the low power consumption, since the energy concerned is high but for short periods.

It is clear that the above description has been given only by way of non limiting example and that changes and modifications to the described embodiment, especially in respect of shapes, sizes, materials, kinds of components and so on, are possible without departing from the scope of the invention. For instance, also when the yokes, and hence the cells, form a complete ring in front of the rotor, they do not need to be regularly distributed along the rotor circumference. This non-regular distribution is useful in reducing cogging, as well as when the device comprises both generator and motor modules or has a multiphase structure. If necessary, the non-regular distribution of the stator cells can be electronically compensated for by the control system of the device. Also, further applications besides those mentioned above are possible.

The invention claimed is:

1. An electromagnetic device with reversible generator-motor operation, the device comprising:
   a rotor rotating about an axis and bearing a plurality of magnets distributed at regular intervals there around and with alternate orientations in a substantially ring-shaped pattern;
   a stator comprising at least one set of individual magnetic yokes each having a pair of projecting arms that extend towards the magnets and bear a respective coil for electrical connection to a utilising device or a power driver, a magnetic yoke in each set being part together with a pair of magnets confronting the yoke arms at a given instant, and an air gap separating the yoke from the magnets, of a same closed magnetic circuit;
   the individual magnetic yokes being independently mounted on supports that are adjustable by a mechanism under the control of an electronic control unit to dynamically adjust the positions of the individual magnetic yokes relative to the magnets during operation of the device.

2. The device as claimed in claim 1, wherein said supports are axially adjustable through a translational movement.

3. The device as claimed in claim 1, wherein said supports are further adjustable through a pivotal movement about at least one axis.

4. The device as claimed in claim 3, wherein said supports are adjustable through a pivotal movement about three axes.

5. The device as claimed in claim 1, wherein said stator includes a single set of individual magnetic yokes.

6. The device as claimed in claim 5, wherein said rotor is made of ferromagnetic material, and said magnetic circuit comprises a pair of magnets and one yoke facing the magnet pair and it is closed through the rotor and the air gap separates the yoke from the magnets.

7. The device as claimed in claim 5, wherein said rotor (12; 12'), in areas not occupied by the magnets (14; 14'; 14'a, 14'b; 140), is made of non-ferromagnetic material, the magnets (14; 14'; 14'a, 14'b; 140) facing a same yoke are connected by ferromagnetic elements (61), and said magnetic circuit comprises a pair of magnets (14; 14'; 14'a, 14'b; 140) and one yoke (16; 16') facing the magnet pair, and it is closed through the ferromagnetic elements (61) and an air gap separating the yoke from the magnets.

8. The device as claimed in claim 2, wherein said magnets are glued onto the surface of the rotor facing the yokes.

9. The device as claimed in claim 1, wherein: said rotor (12, 12'), in areas not occupied by the magnets (14; 14'; 14'a, 14'b; 140), is made of non-ferromagnetic material; said stator (16, 20a, 20b, 18, 22a, 22b; 16', 18', 20', 22') includes a first and a second set of magnetic yokes (16, 18; 16', 18'; 6) symmetrically arranged relative to the rotor (12, 12'), and said magnetic circuit comprises a pair of adjacent magnets (14; 14'; 14a, 14b; 140) and one magnetic yoke (16, 18; 16', 18'; 6) in each of the first and the second set.

10. The device as claimed in claim 1, wherein said magnets are magnetised areas in the rotor and they form a succession of alternately opposite poles onto the rotor surfaces facing the individual magnetic yokes.

11. The device as claimed in claim 1, wherein said individual magnetic yokes are arranged in front of one arc or of a number of discrete arcs of magnets in the magnet ring.

12. The device as claimed in claim 1, wherein said individual magnetic yokes are distributed in front of the whole magnet ring.

13. The device as claimed in claim 12, wherein said rotor bears a number M of magnets chosen out of:
   2N, N being the number of the magnetic yokes in the or each set;
   an even number different from 2N.

14. The device as claimed in claim 1, wherein the coil of each yoke arm is individually connected to a utilising device or a power driver.

15. The device as claimed in claim 13, wherein the coils of the yoke arms having a same geometrical phase relationship with a confronting magnet are connected together inside the device and have a common connection to a utilising device or a power driver.

16. The device as claimed in claim 13, wherein the coils of alternate yoke arms having a same geometrical phase relationship with a confronting magnet are connected together inside the device and have respective common connections with opposite phases to a utilising device or a power driver.

17. The device as claimed in claim 14, wherein the coils of at least some yoke arms are connected to a utilising device, and the coils of at least some other arms are connected to a power driver.

18. The device as claimed in claim 1, wherein said individual magnetic yokes bear a first coil for electrical connection to a utilising device or a power driver, and a second coil acting as a feedback detector.

19. The device as claimed in claim 1, wherein said rotor (12') is a cylindrical body bearing the plurality of magnets (14'a, 14'b) on its side surface and the plurality of magnets are arranged in two parallel rows (14'a, 14'b) on said side surface, a magnet in one row having opposite orientation to an adjacent magnet in the other row and each yoke (16') being arranged so as to bridge both rows of magnets (14'a, 14'b).

20. The device as claimed in claim 19, wherein each yoke (16') and the respective pair of magnets (14'a, 14'b) bridged by it are obliquely arranged with respect to the generatrices of the rotor (12').

21. The device as claimed in claim 1, wherein said arms (17a, 17b, 19a, 19b; 7) and said magnets (14; 14'; 14'a, 14'b; 140) have a cross sectional shape chosen out of the group including: circular cross section; non-circular curvilinear cross section; concave polygonal cross section; convex polygonal cross section, in particular square or rectangular; and wherein facing areas of the magnets (14; 14'; 14'a, 14'b; 140) and the arms (17a, 17b, 19a, 19b; 7) have similar sizes.

22. The device as claimed in claim 21, wherein said yoke arms and said magnets have different cross-sectional shapes.

23. The device as claimed in claim 1, wherein said magnets are magnetic bodies (140) having a shape chosen out of:
 wedge shape;
 a polyhedral shape with quadrangular bases connected by inclined side faces, the inclinations of the two pairs of opposite side faces being such that they produce an opposite tapering of the plate;
 frusto-conical shape.

24. The device as claimed in claim 23, wherein adjacent magnets (140) have located therebetween tapered retaining members having a complementary tapering to that defined by confronting surfaces of said adjacent magnets (140).

25. The device as claimed in claim 23, wherein adjacent magnets (140) have located therebetween tangentially operating resilient or elastomeric retaining members (60).

26. The device as claimed in claim 1, wherein each yoke arm (7) includes a base (7c) for being secured to a support, a stem (7b) extending from the base (7c) towards the magnets (14'; 140) and having the coil (21) wound thereon, and a head (7a) joined to the stem end opposite to the base (7c), and wherein said head has a greater cross sectional size than the overall cross sectional size of the stem (7b) and the coil (21) and is arranged to hide the coil (21) to a confronting magnet (14'; 140).

27. The device as claimed in claim 26, wherein each yoke (6) comprises a pair of individually mounted arms (7) defining an angle open towards the magnets (14'; 140), and wherein a gap (77) is provided between the bases (7c) of two adjacent arms (7) respectively belonging to two adjacent jokes (6).

28. The device as claimed in claim 1, wherein said yoke arms (17a, 17b, 19a, 19b) are connected by a member having a length equal to the transversal size of the arm, and facing sides of adjacent arms in adjacent yokes (16, 18; 16', 18') are spaced apart by a distance equal to the transversal size of the arm.

29. The device as claimed in claim 1, wherein said individual magnetic yokes are made of a material chosen out of the group: high permeability, low residual flux and low magnetic reluctance ferrites; iron-silicon sheet; Ni—Zn or Mn—Zn ferrites; Mn—Ni materials.

30. The device as claimed in claim 1, wherein the supports of the individual magnetic yokes are equipped with rolling members arranged to cooperate with the rotor surface to keep the air gaps between the individual magnetic yokes and the magnets constant and to compensate for axial and radial oscillations of the rotor.

31. The device as claimed in claim 1, wherein the individual magnetic yokes are associated with temperature detectors and position detectors connected with processing and control circuitry of said electronic control unit arranged to actuate displacement means on the supports to vary the air gap and/or the degree of overlapping between the magnets and the confronting arms in order to vary the concatenated voltage in the individual coils in response to the detected temperature and/or position.

32. The device as claimed in claim 30, wherein the individual magnetic yokes together with their coils, their supports, support and adjusting units for the rolling members, the detectors and the control and processing circuitry are embedded within a resin layer, possibly charged with powder materials increasing thermal conductivity.

33. The device as claimed in claim 32, wherein said resin layer is provided with heat dissipating members.

34. The device as claimed in claim 1, wherein said device (10) is integrated in an impeller of an apparatus driven by the motion of a fluid.

35. An apparatus having an impeller driven by the motion of a fluid, characterised in that said impeller has integrated therein a device (10) as claimed in claim 1.

36. The apparatus as claimed in claim 35, wherein said apparatus is chosen out of the group including: turbines, in particular for aeronautical or naval engines, screws of propellers for aeronautical or naval applications, pumps for gas pipelines, Aeolian generators.

37. The device as claimed in claim 1, wherein the electronic control unit includes signal processing and control circuits for receiving signals from position detectors provided within the individual magnetic yoke mounting supports to thereby control the dynamic adjustment of the position of individual magnetic yokes.

* * * * *